H. E. J. FOERSTER.
SPRING WHEEL.
APPLICATION FILED SEPT. 30, 1911.

1,023,010.

Patented Apr. 9, 1912.
2 SHEETS—SHEET 1.

Witnesses
Alfred G. Seiler

Inventor
Harry E. J. Foerster
By Victor J. Evans
Attorney

H. E. J. FOERSTER.
SPRING WHEEL.
APPLICATION FILED SEPT. 30, 1911.

1,023,010.

Patented Apr. 9, 1912.
2 SHEETS—SHEET 2.

Inventor
Harry E. J. Foerster
By Victor J. Evans
Attorney

Witnesses
Alfred G. Seiler

UNITED STATES PATENT OFFICE.

HARRY E. J. FOERSTER, OF ST. LOUIS, MISSOURI.

SPRING-WHEEL.

1,023,010.   Specification of Letters Patent.   Patented Apr. 9, 1912.

Application filed September 30, 1911. Serial No. 652,065.

*To all whom it may concern:*

Be it known that I, HARRY E. J. FOERSTER, a citizen of the United States, residing at St. Louis, State of Missouri, have invented new and useful Improvements in Spring-Wheels, of which the following is a specification.

The invention relates to vehicle wheels, and more particularly to the class of spring wheels.

The primary object of the invention is the provision of a vehicle wheel of this type in which the tread portion thereof will be resiliently supported, so as to permit the yielding of the vehicle wheel when traveling over irregular ground, so that all shocks and jars incident to the travel thereof will be absorbed by the wheel.

Another object of the invention is the provision of a wheel of this character in which the springs interposed between the tread and the felly of the wheel may be adjusted, so as to increase or decrease the tension thereof, thereby regulating the resiliency of the vehicle wheel for the absorption of shocks and jars incident to the travel of the same.

A further object of the invention is the provision of a wheel which is simple in construction, strong, durable, capable of being easily and quickly repaired, possessing the requisite yieldability for the absorption of shocks and jars incident to the travel thereof, and that is inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
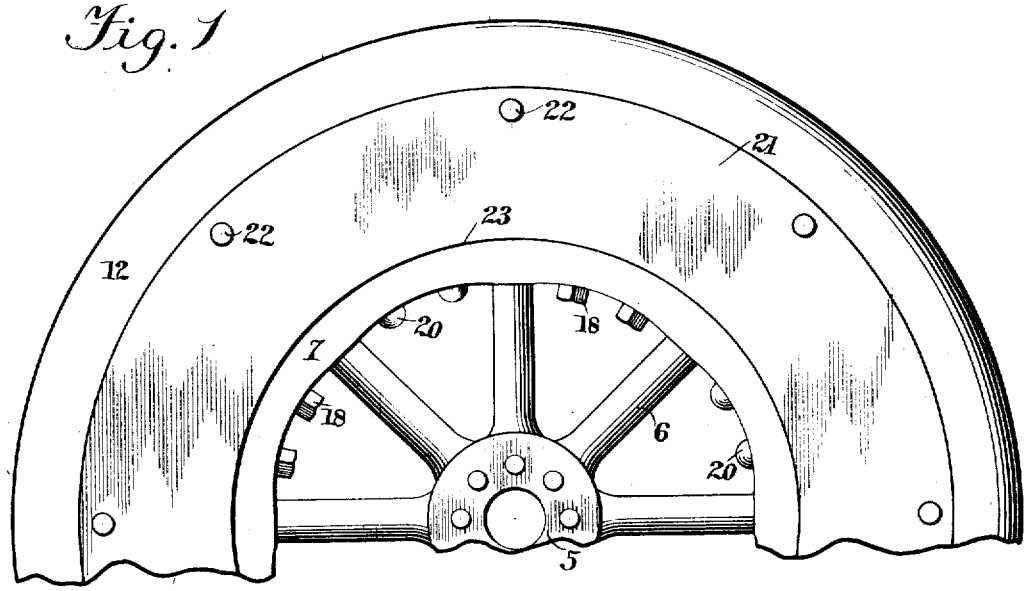
Figure 2:
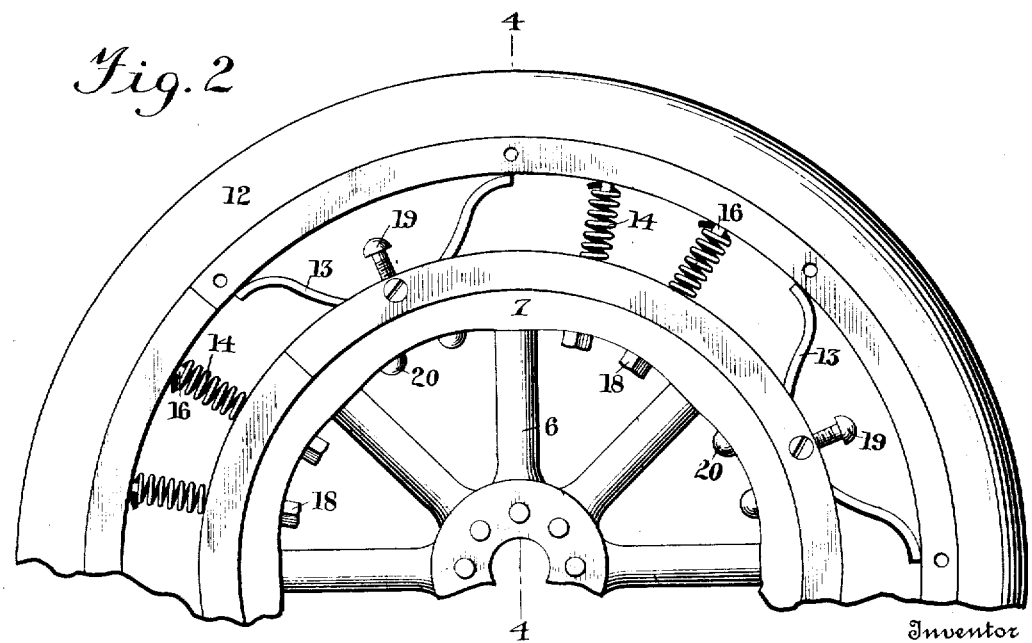
Figure 3:
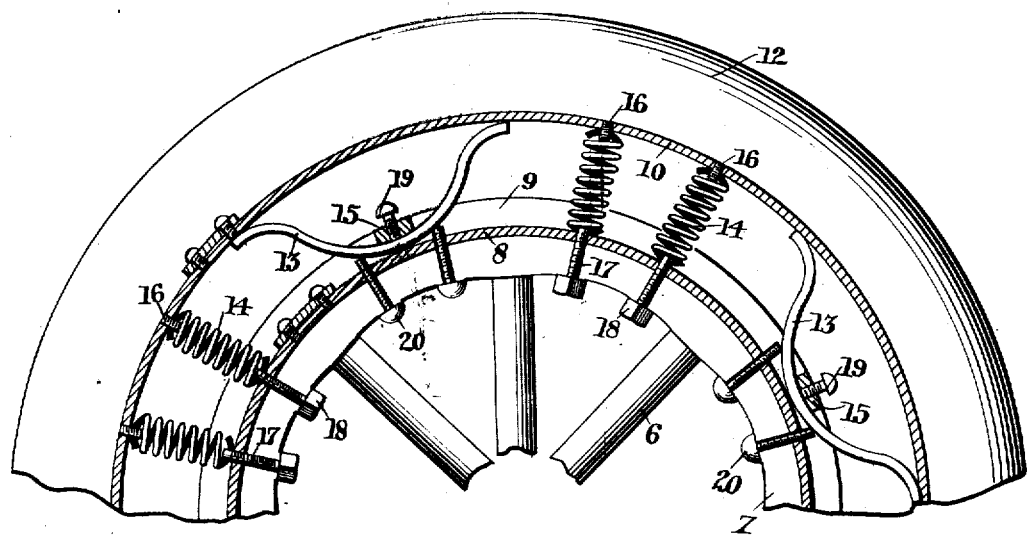
Figure 4:
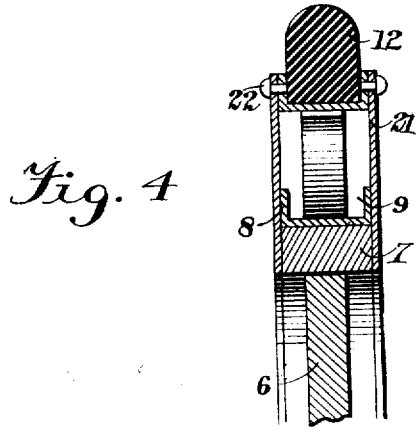

In the drawings: Figure 1 is a fragmentary side elevation of a wheel constructed in accordance with the invention. Fig. 2 is a similar view, showing one of the side plates removed. Fig. 3 is a fragmentary vertical sectional view through the wheel. Fig. 4 is a sectional view on the line 4—4 of Fig. 2.

Similar reference characters indicate corresponding parts throughout the several views of the drawings.

Referring to the drawings by numerals, the vehicle wheel comprises a hub 5 which is of the ordinary well-known construction, having projecting therefrom the usual radial spokes 6, the outer ends of which are connected with the felly 7, surrounded by a ring or annulus 8, the same being formed in its outer face with a channel 9 forming a seat for resilient devices, presently described.

Arranged concentrically with respect to the ring or annulus is a split rim or annulus 10 which is of considerably greater diameter than the ring or annulus 8, and is formed in its outer surface with a channel 11 receiving a rubber tire 12 of the cushion type, although the same may be of any other type desired, and of the ordinary well-known construction.

Interposed between the inner ring 8 and the outer rim 10 are alternately arranged leaf and coiled spring elements 13 and 14, respectively, the coiled spring elements being of the compression type, and are arranged in pairs between the leaf springs 13 which are inwardly bowed, the free ends of which frictionally engage the outer rim 10, while the medial portions thereof are bridged by transversely disposed retaining blocks 15 suitably fixed to the opposite walls of the channel 9 in the ring 8. The coiled springs 14 have their ends connected in outer and inner adjusting screws 16 and 17, respectively, the outer screws 16 being threaded in the outer rim 10, while the inner screws 17 are passed through suitable alining apertures formed in the inner ring 8 and the felly 7, and have engaged therewith nuts 18, so that the tension of the said coiled springs 14 may be increased or decreased on the adjustment of the said nuts 18, when desired. Threaded in the blocks 15 are binding screws 19 which engage the leaf springs 13, so as to prevent displacement thereof. Threaded in the felly 7 and the inner ring 8, at opposite sides of the blocks 15, are adjusting screws 20 which are designed to engage with the leaf springs 13, for increasing or decreasing the bowed formation thereof, thereby regulating the tension of the same, and also to permit the centering of the hub 5 in the wheel.

Disposed against opposite sides of the inner ring 8 and the outer rim 10 are circular side or guide plates 21, the same being fixed to the sides of the outer rim 10 by means of screw members 22. The said plates 21 are provided with open centers 23, and said plates serve to prevent the lateral displacement of the inner ring 8 and the felly 7 carrying the same, and also guide the center portion of the wheel when the same is displaced during the travel of the wheel over irregular portions of the ground, the springs being designed to absorb shocks and jars incident to the travel of the wheel.

It is of course to be understood that changes in the form, proportion, and the minor details of construction may be resorted to, without departing from the spirit, or sacrificing any of the advantages of the invention.

What is claimed is:

The combination with a wheel rim, of an externally channeled band mounted about said rim and having cross bridge pieces at intervals throughout its circumference, a tire supporting annulus arranged concentrically about the said band, inwardly bowed springs trained beneath the bridge pieces and having their ends frictionally engaging and supporting the annulus, locking screws threaded in the bridge pieces for securing the springs against longitudinal displacement, and adjusting screws threaded through the rim and band and engaging each spring at two points thereof spaced from its center.

In testimony whereof I affix my signature in presence of two witnesses.

HARRY E. J. FOERSTER.

Witnesses:
JOHN E. FOERSTER,
ALBERT KOLAFA.